(12) United States Patent
Matsuura et al.

(10) Patent No.: US 7,457,525 B2
(45) Date of Patent: Nov. 25, 2008

(54) SYSTEM MULTIPLEXING APPARATUS PREVENTING OVERFLOW OF AUDIO DECODER BUFFER

(75) Inventors: Yoshinori Matsuura, Hyogo (JP); Hiroshi Segawa, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 935 days.

(21) Appl. No.: 10/677,228

(22) Filed: Oct. 3, 2003

(65) Prior Publication Data
US 2004/0170387 A1 Sep. 2, 2004

(30) Foreign Application Priority Data
Feb. 17, 2003 (JP) ............... 2003-038467

(51) Int. Cl.
*H04N 5/91* (2006.01)
*H04N 7/00* (2006.01)
*H04J 3/12* (2006.01)

(52) U.S. Cl. ............... 386/98; 386/46; 386/95; 386/83; 370/538

(58) Field of Classification Search ............ 370/535
See application file for complete search history.

(56) References Cited

U.S. PATENT DOCUMENTS

| 5,481,543 | A | * | 1/1996 | Veltman | 370/473 |
| 5,802,068 | A | * | 9/1998 | Kudo | 370/538 |
| 6,418,140 | B1 | * | 7/2002 | Matsui | 370/378 |
| 7,280,741 | B2 | * | 10/2007 | Klausberger et al. | 386/95 |
| 2002/0141738 | A1 | * | 10/2002 | Yagi et al. | 386/98 |
| 2002/0159758 | A1 | * | 10/2002 | Okuyama et al. | 386/95 |
| 2003/0021298 | A1 | * | 1/2003 | Murakami et al. | 370/535 |

FOREIGN PATENT DOCUMENTS

JP 8-98160 4/1996

OTHER PUBLICATIONS

"Development of an MPEG-2 Video Encoder LSI with a multiplexing function", N. Hayashi et al., ITE Technical Report vol. 23, No. 65, pp. 49-54 Nov. 20, 1998 (with partial translation).

\* cited by examiner

*Primary Examiner*—Rafael Pérez-Gutiérrez
*Assistant Examiner*—German Viana Di Prisco
(74) *Attorney, Agent, or Firm*—McDermott Will & Emery LLP

(57) ABSTRACT

A time zone start time point calculating unit calculates a time zone to be set in a VOBU in accordance with audio bit rate. A time zone comparing unit compares a time point at which an audio pack is to be multiplexed with the time zone calculated by the time zone start time point calculating unit. A flag setting unit sets whether the audio pack is to be completed or not in accordance with the result of comparison by the time zone comparing unit. Therefore, a completing process takes place before a VOBU boundary, and a completed PCK will not be generated immediately after the VOBU boundary. Thus, generation of a buffer overflow can be prevented.

2 Claims, 21 Drawing Sheets

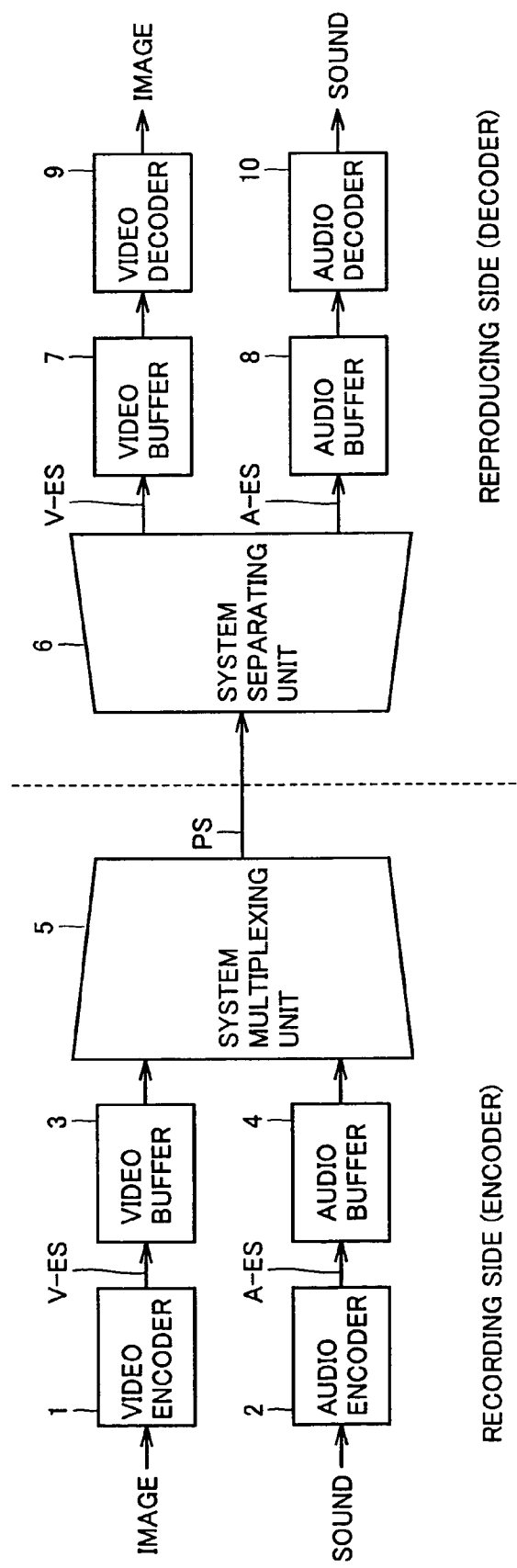

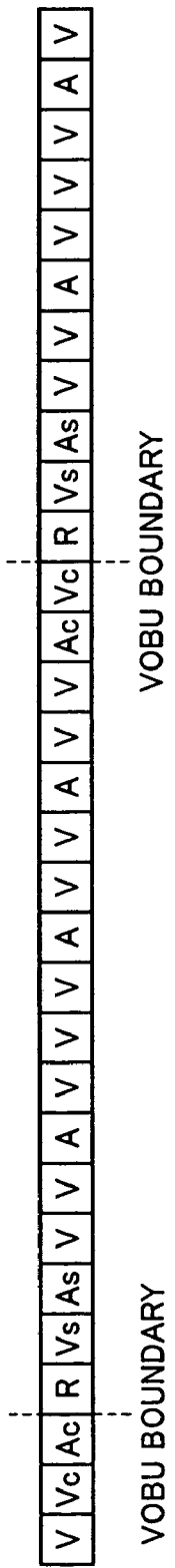

FIG.7

| IMAGE RECORDING MODE | SOUND RECORDING MODE | bitrate (kbps) | FRAME LENGTH (byte) | PCK PERIOD |
|---|---|---|---|---|
| — | 1 | 64 | 256 | 22725 |
| — | 2 | 80 | 320 | 18180 |
| — | 3 | 96 | 384 | 15150 |
| — | 4 | 112 | 448 | 12986 |
| — | 5 | 128 | 512 | 11363 |
| — | 6 | 160 | 640 | 9090 |
| LONG TIME | 7 | 192 | 768 | 7575 |
| — | 8 | 224 | 896 | 6493 |
| STANDARD | 9 | 256 | 1024 | 5681 |
| — | 10 | 320 | 1280 | 4545 |
| HIGH QUALITY | 11 | 384 | 1536 | 3788 |
| — | 12 | 448 | 1792 | 3246 |

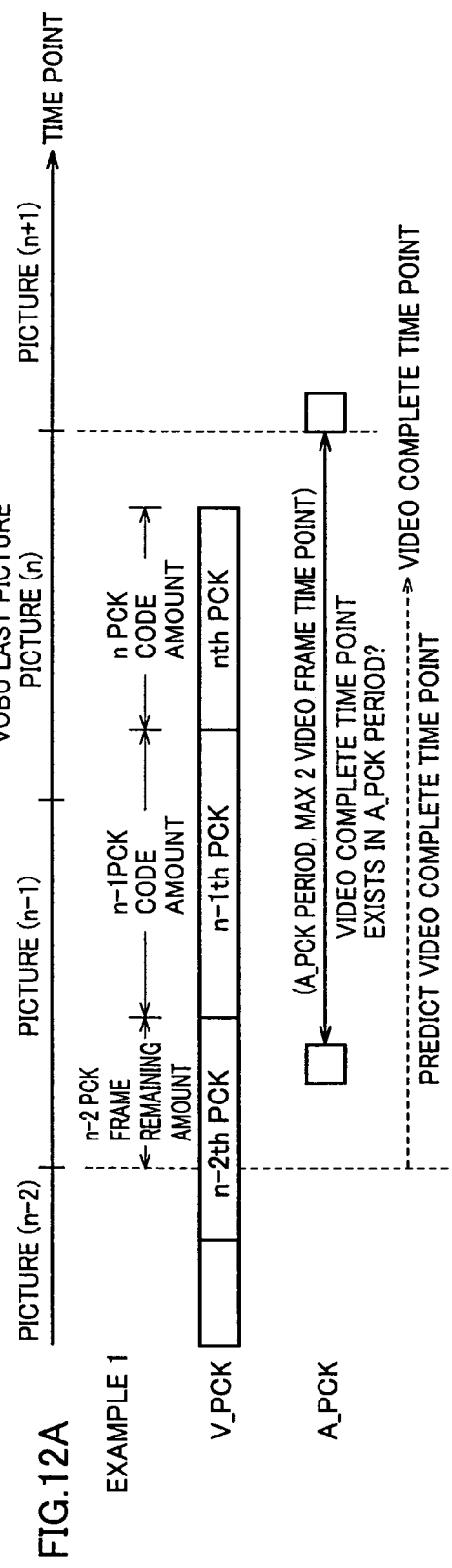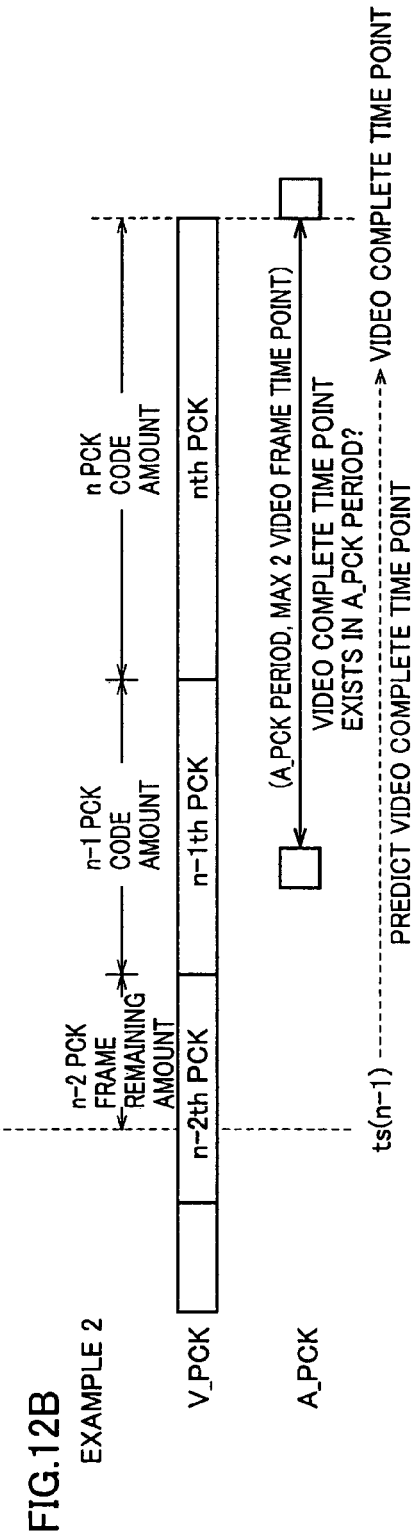

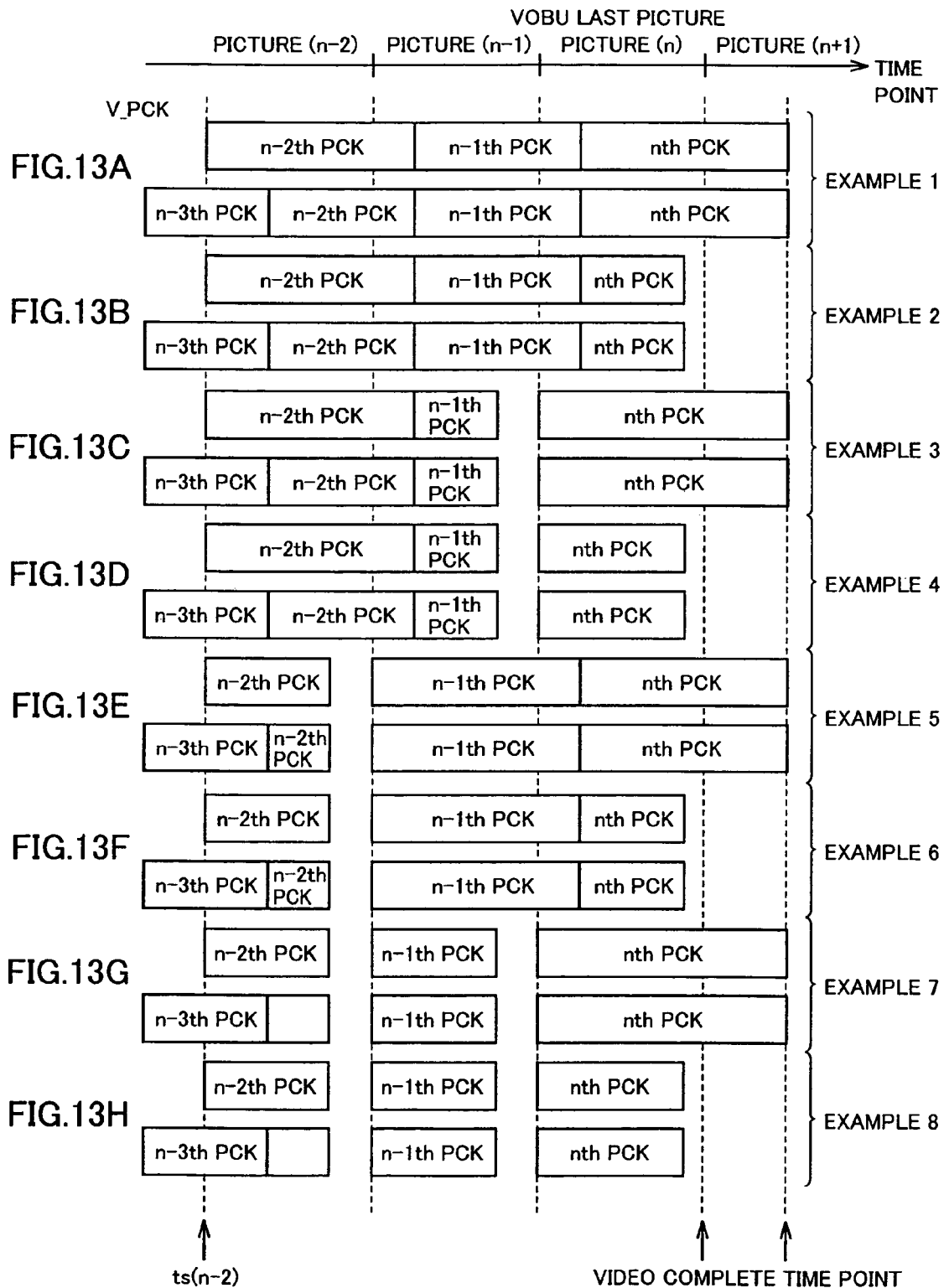

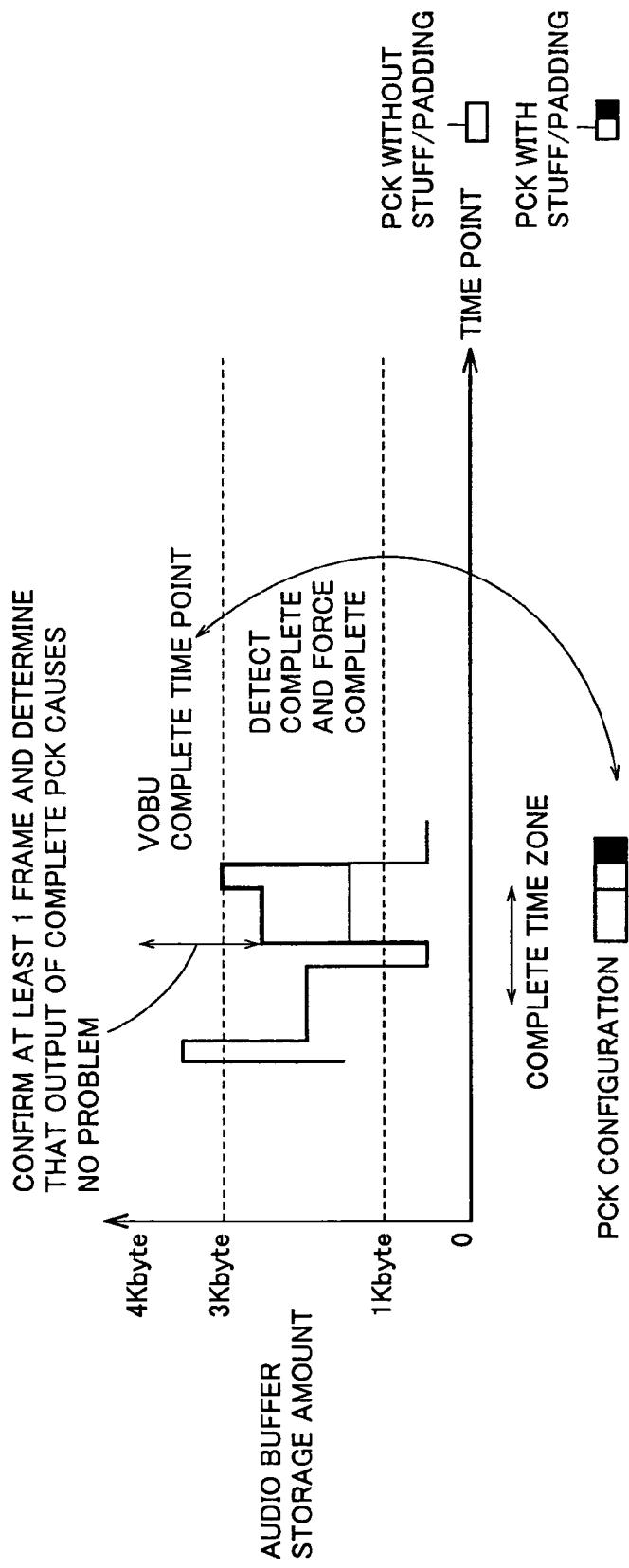

SYSTEM MULTIPLEXING APPARATUS PREVENTING OVERFLOW OF AUDIO DECODER BUFFER

BACKGROUND OF THE INVENTION

1. Field of the Invention

The present invention relates to system multiplexing for forming one stream of digitally compressed image and audio data and, more specifically, to a system multiplexing apparatus preventing an overflow of a buffer in an audio decoder.

2. Description of the Background Art

Recently, along with performance improvement of semiconductor devices, methods of digitally compressing images and sounds have been vigorously studied, and international standard specifications for digital compression of images and sounds, including MPEG (Moving Picture Experts Group) specification, have been determined. In compliance therewith, video recording and reproducing apparatuses for digital TV broadcast, DVD (Digital Versatile Disc) and the like utilizing digital compression are becoming popular.

When moving images and sounds are to be handled simultaneously, a process referred to as system multiplexing is necessary, by which digitally compressed image and audio data are turned into one stream. In the system multiplexing process, image data and audio data are divided into small units, and the data are arranged in order considering amounts of data and time points of display and reproduction, to form one collective stream.

Japanese Patent Laying-Open No. 8-98160 discloses a related technique. A data multiplexing apparatus disclosed in Japanese Patent Laying-Open No. 8-98160 includes a plurality of encoders encoding input digital sounds and moving images and outputting the result as an encoded stream, multiplexes a plurality of such encoded streams to enable simultaneous reproduction, and the apparatus includes control means for performing virtual decoding buffer simulation for each of the encoded streams and outputting a multiplex request signal based on an amount of occupation by the data in the buffer, and multiplexing means for multiplexing each of the encoded streams based on the multiplex request signal.

In the data multiplexing apparatus disclosed in Japanese Patent Laying-Open No. 8-98160 mentioned above, virtual decoding buffer simulation is performed for each encoded stream and multiplexing is done based on the amount of data occupation in the buffer. When audio completing of a VOBU (video object unit) boundary is performed, however, an overflow may occur undesirably in a buffer of an audio decoder, as will be described later.

SUMMARY OF THE INVENTION

An object of the present invention is to provide a system multiplexing apparatus capable of reducing loss in multiplexing, while preventing an overflow in an audio buffer.

According to an aspect, the present invention provides a system multiplexing apparatus for outputting video and audio packs multiplexed with each other, including a calculating unit calculating a time zone to be set in a video object unit in accordance with audio bit rate, a comparing unit comparing a time point of multiplexing an audio pack with the time zone calculated by the calculating unit, and a setting unit setting whether the audio pack is to be completed or not, in accordance with the result of comparison by the comparing unit.

The comparing unit compares the time point of multiplexing the audio pack and the time zone calculated by the calculating unit, and the setting unit sets whether the audio pack is to be completed or not in accordance with the result of comparison by the comparing unit. Therefore, the completing process takes place before the VOBU boundary, a complete PCK is not generated immediately after the VOBU boundary, and therefore, generation of a buffer overflow can be prevented.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram representing schematic configurations of a recorder and a reproducer, including the system multiplexing apparatus.

FIG. 2 shows an example of a PS configuration.

FIG. 7 represents relation of image recording mode, sound recording mode, bit rate, frame length and PCK period.

FIGS. 12A and 12B illustrate an example of calculation of video complete time point.

FIGS. 13A to 13H represent 8 variations generated dependent on whether the last V_PCK time point of each picture exceeds a picture period time or not.

FIG. 22 illustrates audio buffer transition when VOBU completing process is forced immediately after an output of an ordinary PCK.

DESCRIPTION OF THE PREFERRED EMBODIMENTS

Figure 3A:
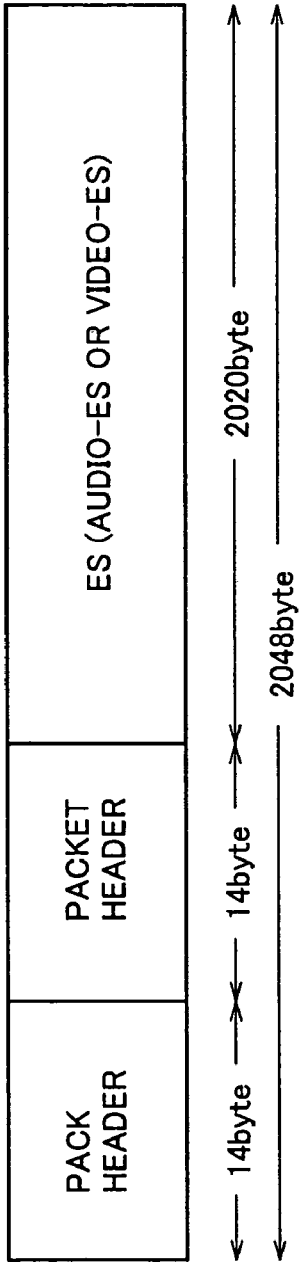
FIGS. 3A to 3C represent PCK configuration in compliance with DVD specification.

FIG. 1 is a block diagram representing a schematic configuration of a recorder (encoder) and a reproducer (decoder), including a system multiplexing apparatus (hereinafter also referred to as a system multiplexing unit).

The recorder includes a video encoder 1 encoding image data, an audio encoder 2 encoding audio data, a video buffer 3 temporally storing V-ES (Video-Elementary Stream) output from video encoder 1, an audio buffer 4 temporally storing A-ES (Audio-Elementary Stream) output from audio encoder 2, and a system multiplexing unit 5 multiplexing V-ES and A-ES output from video buffer 3 and audio buffer 4 and outputting the result as a PS (Program Stream).

The reproducer includes a system separating unit 6 separating the PS into V-ES and A-ES, a video buffer 7 temporally storing V-ES separated by system separating unit 6, an audio buffer 8 temporally storing A-ES separated by system separating unit 6, a video decoder 9 decoding V-ES output from video buffer 7, and an audio decoder 10 decoding A-ES output from audio buffer 8.

FIG. 2 illustrates an exemplary configuration of PS. PS consists of VOBUs. Each VOBU includes Audio, Video and RDI (Real time Data Information) PCKs, beginning with RDI_PCK and ending with completed V_PCK (Vc) and A_PCK (Ac).

According to DVD-Video Recording specification (hereinafter referred to as DVD specification), a completing process for completing images and sounds in a frame unit is necessary for each VOBU (GOP (Group Of Pictures): a unit of about 15 pictures). The completing process is a process to fill ES shortage of a PCK of 2 KB (2048 bytes) with a stuff or padding.

Figure 3B:
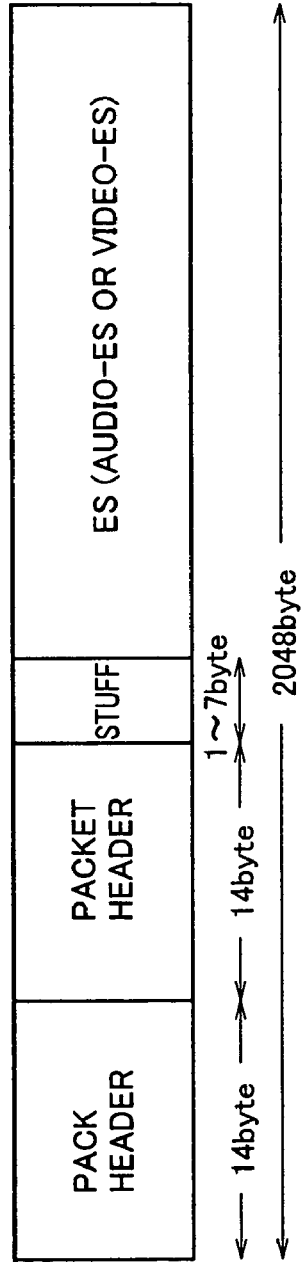
Figure 3C:
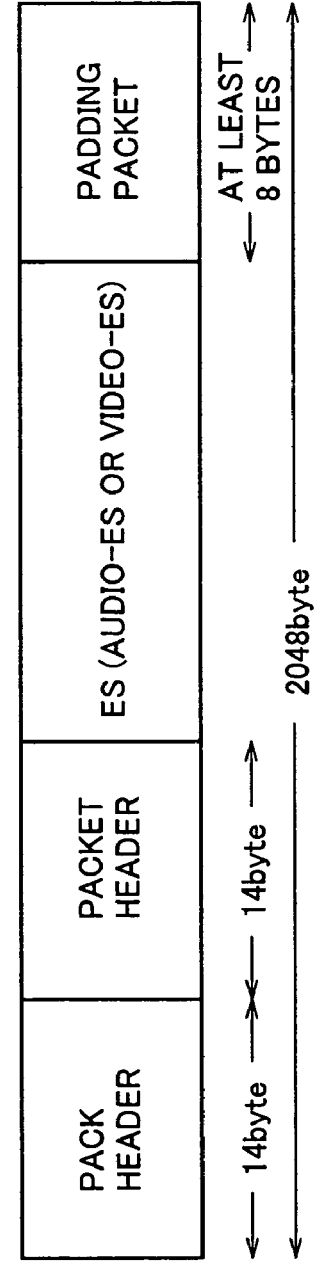

FIGS. 3A to 3C represent a PCK configuration in compliance with the DVD specification. FIG. 3A represents an ordinary PCK configuration that includes a Pack Header of 14 bytes, a Packet Header of 14 bytes, and ES of 2020 bytes.

FIG. 3B represents a VOBU complete PCK with a stuff inserted, which includes Pack Header of 14 bytes, Packet Header of 14 bytes, Stuff of 1 to 7 bytes and ES of an arbitrary length.

FIG. 3C represents a configuration of a VOBU complete PCK with a padding, which includes Pack Header of 14 bytes, Packet Header of 14 bytes, ES of an arbitrary length, and Padding Packet of at least 8 bytes.

In video encoding in accordance with the DVD specification or the like that involves VBR (Variable Bit Rate) control, the amount of codes for one picture is not constant, and a VOBU boundary appears at any time point dependent on the video code amount.

Further, different conditions for system multiplexing are defined as specifications for different applications, as can be seen from the fact that specification of DVD-Video for reproduction only differs from the specification of DVD-VR for both recording and reproduction. According to the DVD specification, the size of an audio buffer of a decoder is defined to be 4 KB.

Figure 4:
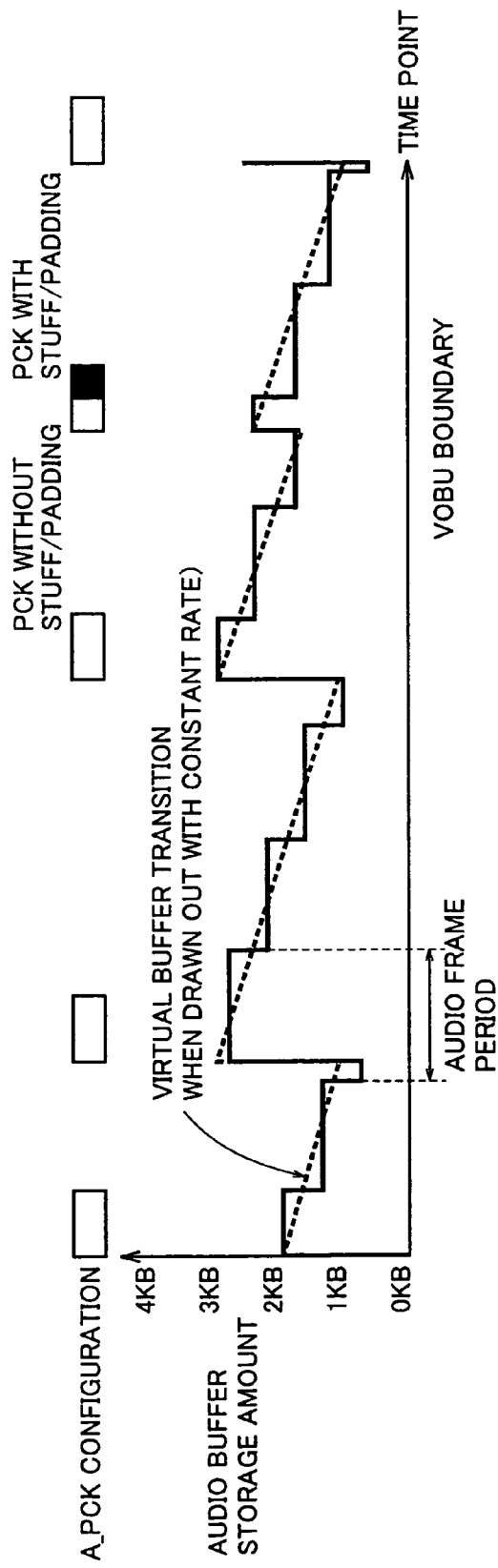
FIG. 4 shows transition of audio buffer storage amount of a decoder.

FIG. 4 shows a transition of the amount of storage in the audio buffer of the decoder. When a PCK is output from system separating unit 6, data is input to audio buffer 8 (amount of storage increases), and at a decode time point for every frame period, data is output to audio decoder 10 (amount of storage decreases). To realize control (audio buffer control) that prevents any overflow/underflow while inputting PCK of 2 KB into audio buffer 8 of 4 KB, the amount of storage is changed with 2 KB being the center.

For this purpose, virtual buffer remaining capacity is calculated assuming that data is drawn out from audio buffer 8 at a constant rate, and when the virtual buffer remaining capacity reaches 1 KB, the next PCK is output from system separating unit 6, as shown in FIG. 4. This method will be referred to as virtual buffer control method in the following.

Figure 5:
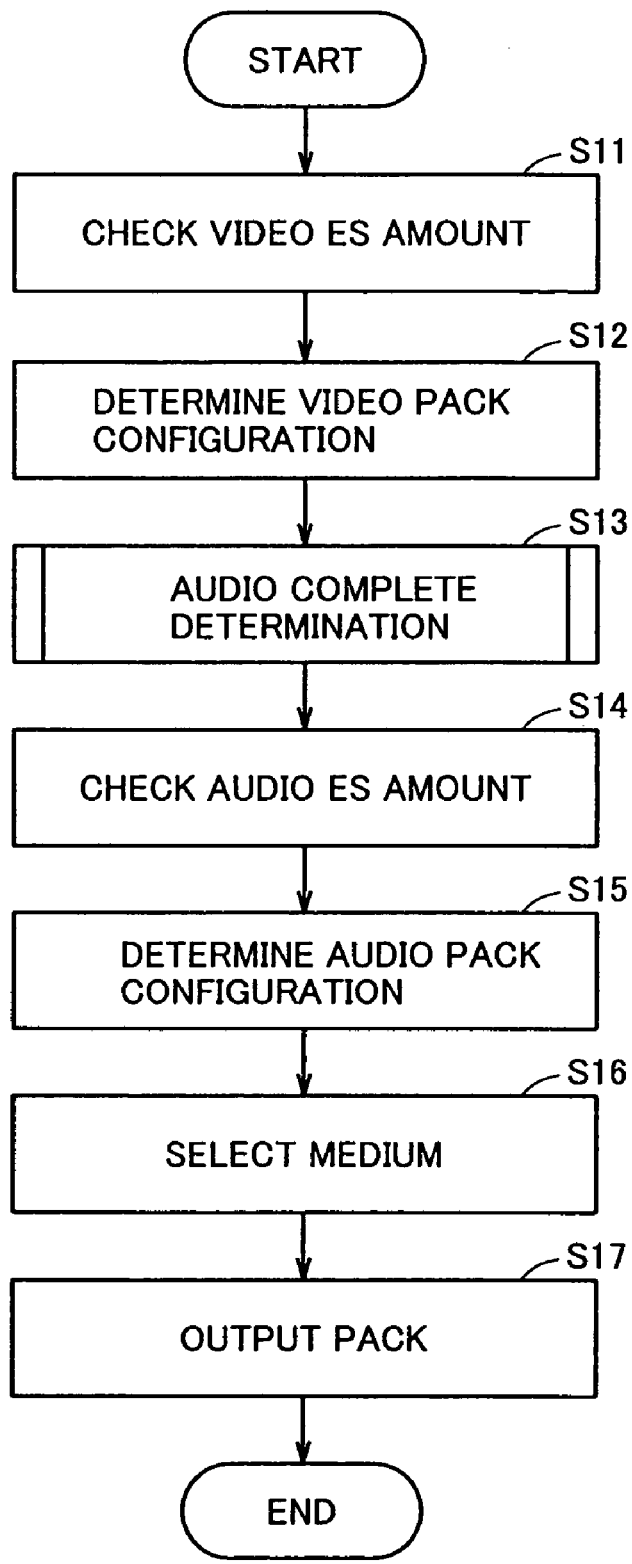
FIG. 5 is a flow chart representing process steps performed by a system multiplexing unit 5.

FIG. 5 is a flow chart representing process steps performed by system multiplexing unit 5. System multiplexing unit 5 confirms whether V_ESs sufficient to form one PCK exist in video buffer 3 or not (S11). When there are sufficient V_ESs in video buffer 3, system multiplexing unit 5 determines which one of the PCK configurations shown in FIGS. 3A to 3C is to be employed (S12).

Thereafter, system multiplexing unit 5 determines whether VOBU boundary is recognized and a complete PCK is formed, in the video PCK configuration, and determines whether an audio PCK should also be completed or not (S13). Details of this step will be described later.

Next, as in the case of V_ES, system multiplexing unit 5 confirms whether A_ESs sufficient to form one PCK exist in audio buffer 4 or not (S14). When there are sufficient A_ESs in audio buffer 4, system multiplexing unit 5 determines which one of the PCK configurations shown in FIGS. 3A to 3C is to be employed (S15).

Then, system multiplexing unit 5 determines whether a video PCK or an audio PCK is to be output (S16). Finally, system multiplexing unit 5 outputs the selected video PCK or audio PCK (S17).

Figure 6:
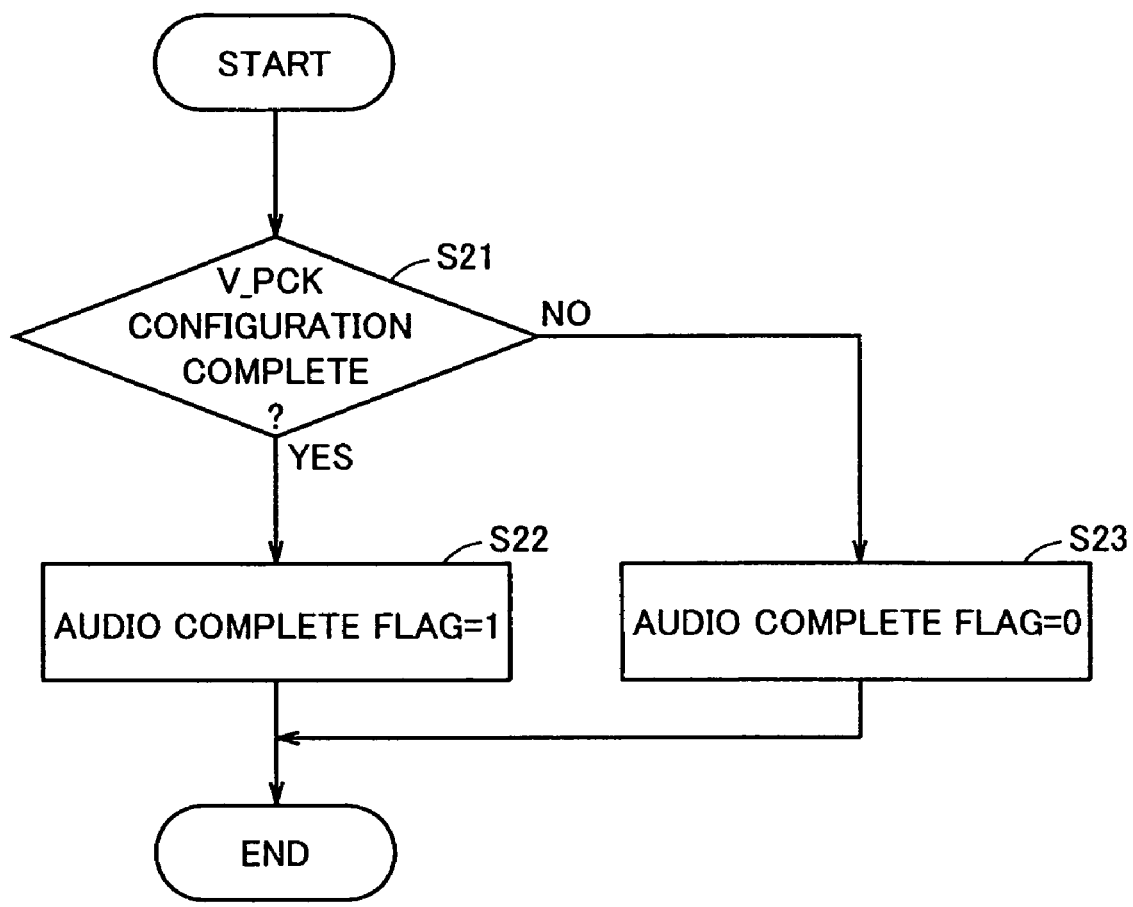
FIG. 6 is a flow chart representing details of step S13 shown in FIG. 5.

FIG. 6 is a flow chart representing the details of the process step S13 shown in FIG. 5. First, system multiplexing unit 5 determines whether the video PCK configuration is a complete PCK or not (S21). When the video PCK is a complete PCK (S21, YES), the next audio PCK is determined to be a complete PCK, and an audio complete flag is set to 1 (S22). When the video PCK is not a complete PCK (S21, NO), the next audio PCK is determined not to be a complete PCK, and the audio complete flag is set to 0 (S23). In the following, this method will be referred to as VOBU boundary forced complete method.

FIG. 7 represents relation between each of image recording mode, sound recording mode, bit rate, frame length and PCK period in AC-3. By way of example, when the image recording mode is "high quality" and the sound recording mode is 11, the bit rate is 384 kbps, the frame length is 1536 bytes, and the PCK period is 3788 SCR.

Figure 8:
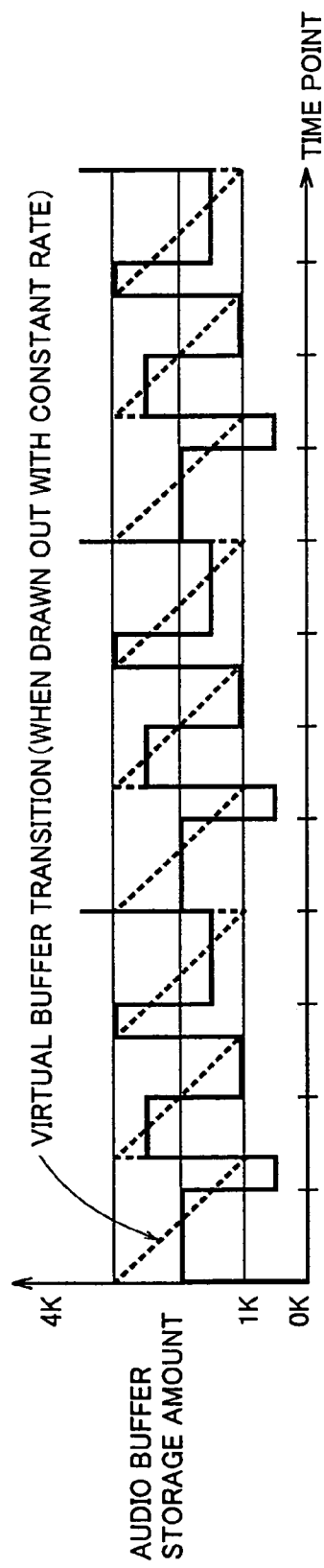
FIG. 8 represents buffer transition when a virtual buffer control method is applied to a mode in which one audio frame is long.

FIG. 8 shows buffer transition when the virtual buffer control method is applied to a mode in which one audio frame is long, for example the high quality mode (with bit rate of 384 kbps and frame length of 1536 bytes) of FIG. 7. The decoder controls the amount of storage with the buffer storage amount of 2 KB regarded as the center. In this example, however, the amplitude to the upper and lower sides becomes large, resulting in undesirably small margin for the upper and lower limits of audio buffer 8.

In such a virtual buffer control method, when the audio frame length is long and the completing process at the VOBU boundary that is unpredictable occurs while the buffer has large amount of storage, an overflow is likely.

Figure 9:
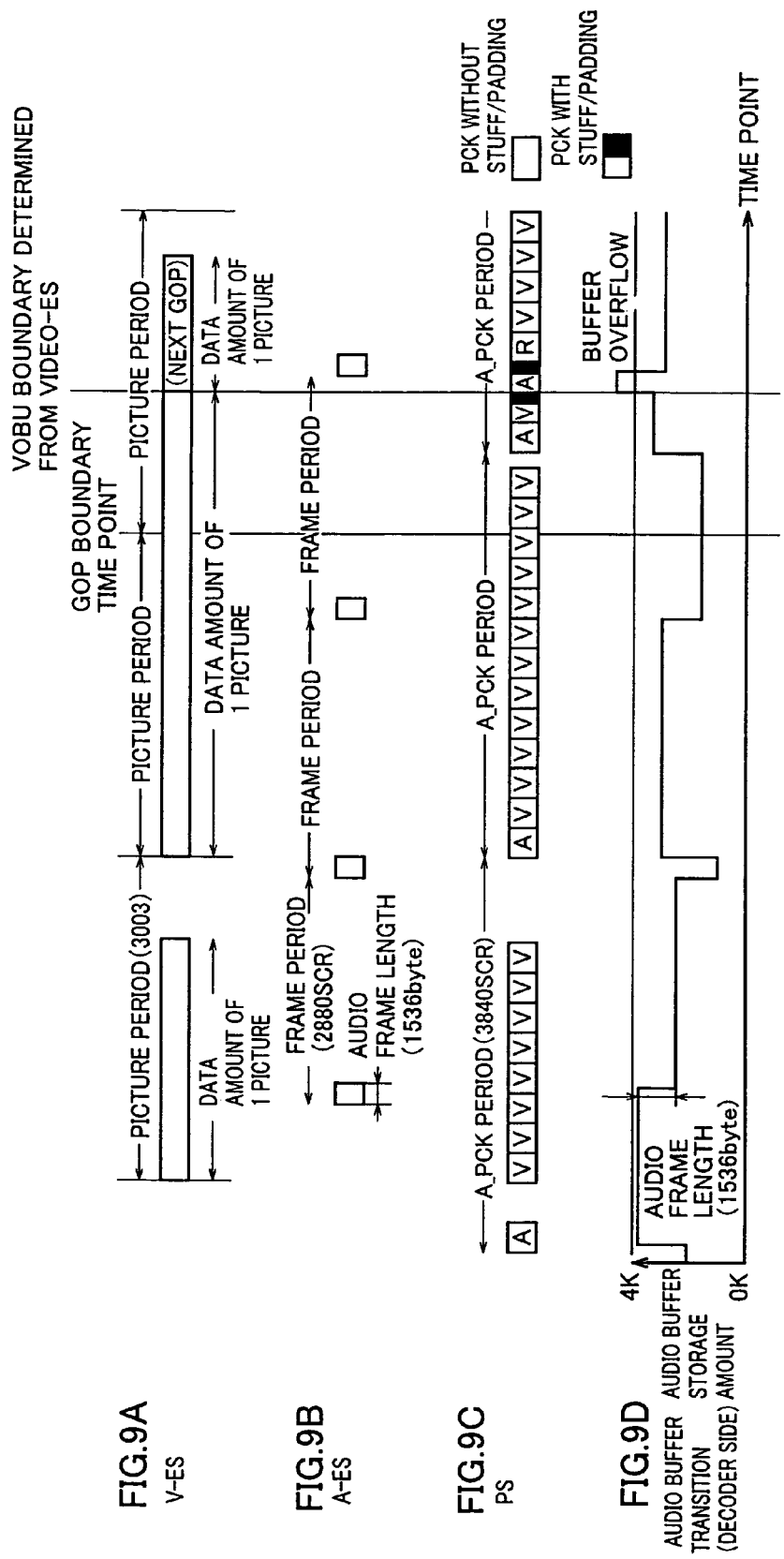
FIGS. 9A to 9D illustrate an example in which an overflow occurs in an audio buffer.

FIGS. 9A to 9D illustrate an occurrence of an overflow in the audio buffer. FIG. 9A represents a V_ES having the picture period of 3003 SCR. FIG. 9B represents an A_ES having the audio frame length of 1536 bytes and the frame period of 2880 SCR. FIG. 9C represents a PS having an audio PCK period of 3840 SCR. FIG. 9D represents buffer transition of audio buffer 8 of the decoder.

As can be seen from FIG. 9C, when a VOBU boundary occurs, a complete PCK is generated. Therefore, occurrence of the VOBU when the amount of storage in the audio buffer is large may cause a buffer overflow.

Figure 10:
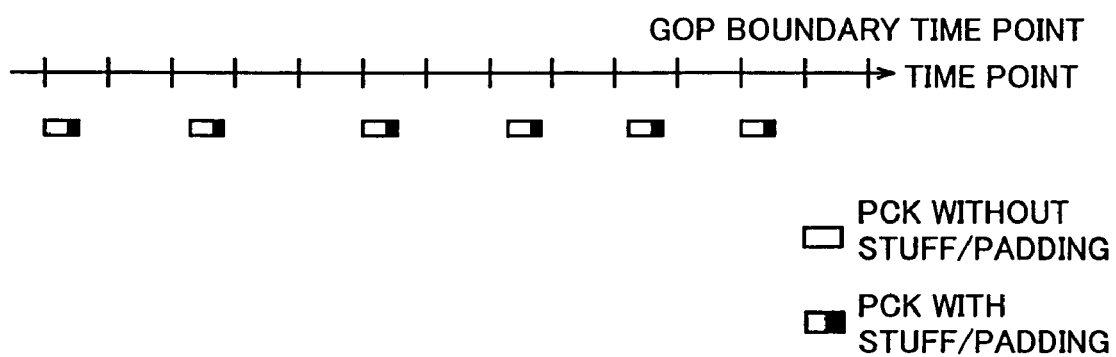
FIG. 10 shows an exemplary solution to the problem illustrated in FIGS. 9A to 9D.

FIG. 10 represents an exemplary solution to the problem described with reference to FIGS. 9A to 9D. As shown in FIG. 10, when all audio PCKs are completed, it becomes unnecessary to generate any new complete PCK at an occurrence of the VOBU boundary, and therefore, a buffer overflow can be prevented. It is noted, however, that the stuff or padding inserted to the complete PCK is meaningless data, and therefore, this solution leads to a problem of lower efficiency of multiplexing.

Figure 11:
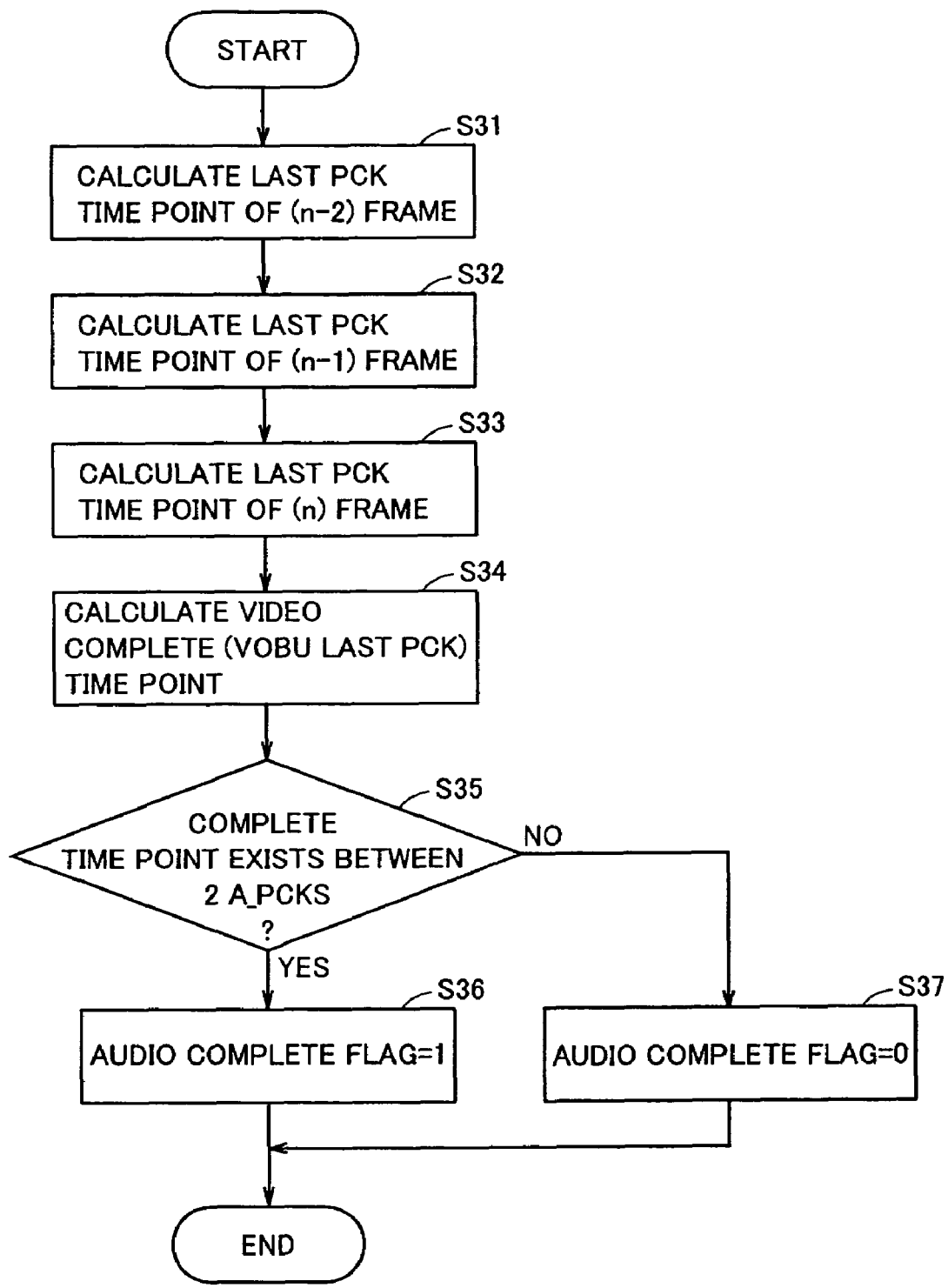
FIG. 11 is a flow chart representing a process for recognizing in advance the VOBU boundary.

As a method of preventing buffer overflow without degrading efficiency of multiplexing, a method has been known in which the VOBU boundary is recognized in advance in an audio complete determining process. FIG. 11 is a flow chart representing the process for recognizing the VOBU boundary in advance. This process corresponds to step S13 of FIG. 5. Further, FIGS. 12A and 12B illustrate examples of calculation of the video complete time point. In the following, the process for recognizing in advance the VOBU boundary shown in FIG. 11 will be described.

First, system multiplexing unit 5 calculates, from the code amount of Video-ES of a picture (picture (n-2)) preceding the last picture of the VOBU by two frames, how many V_PCKs are included therein, and calculates the last V_PCK time point of the picture (n-2) (S31).

Thereafter, in the similar manner, the last V_PCK time point of picture (n-1) is calculated (S32), and the last V_PCK time point of picture (n) is calculated (S33). Then, system multiplexing unit 5 tentatively holds the last V_PCK time point of picture (n) as the video complete time point (S34).

Referring to FIG. 12A, when the video complete time point of picture (n) is earlier than the last time point of picture (n) (picture period time), the last time point of picture (n) is set as the video complete time point. When the video complete time point of picture (n) exceeds the last time point of picture (n), the time point is set as the video complete time point.

In the examples shown in FIGS. 12A and 12B, the last V_PCK time points of pictures (n-2) and (n-1) exceed the picture period time. When the video code amount (number of PCKs) of one picture is smaller than the number of PCKs that can be transmitted within one picture time, it is necessary to set the picture period time as the last V_PCK time point of the picture, and when the number of PCKs of one picture is larger than the number of PCKs that can be transmitted within one picture time, it is necessary to set the time point calculated from the number of PCKs as the last V_PCK time point of the picture.

Here, the time by which the last V_PCK time point exceeds the picture period time will be the start time point of the next picture. Therefore, dependent on whether the last V_PCK time point of respective pictures exceed the picture period time or not, as determined by the code amounts of pictures (n-3), (n-2) and (n-1), there would be eight variations.

FIGS. 13A to 13H illustrate the eight variations generated dependent on whether the last V_PCK time point of respective pictures exceeds the picture period time or not. For example, FIG. 13A shows an example in which the last V_PCK time points of pictures (n-2), (n-1) and (n) exceed the picture period time, respectively. FIG. 13C shows an example in which the last V_PCK time point of picture (n-2) exceeds the picture period time, the last V_PCK time point of picture (n-1) is within the picture period time, and the last V_PCK time point of picture (n) exceeds the picture period time.

As can be seen from the foregoing, in order to calculate the video complete time point, many situations must be taken into consideration, and hence a complicated process is necessary to recognize in advance the VOBU boundary.

In the following, a system multiplexing apparatus that improves efficiency of multiplexing while suppressing increase in time necessary for the audio completing process will be described.

FIRST EMBODIMENT

Schematic configuration of the encoder and decoder including the system multiplexing apparatus in accordance with the first embodiment of the present invention is the same as that of FIG. 1. Therefore, overlapping descriptions of the configuration and functions will not be repeated.

Figure 14:
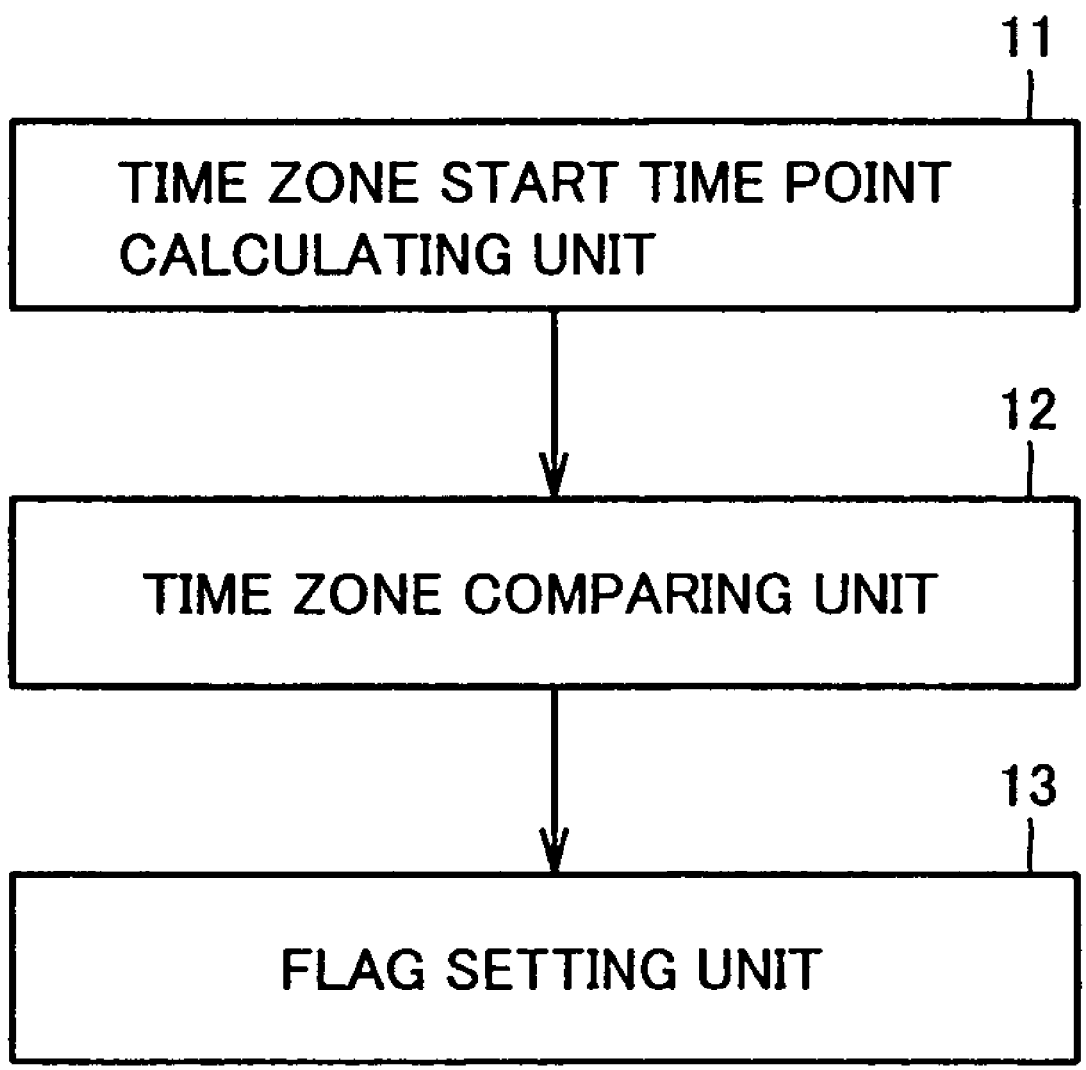
FIG. 14 represents a functional configuration of the system multiplexing apparatus in accordance with the first embodiment of the present invention.

FIG. 14 represents a functional configuration of the system multiplexing apparatus in accordance with the first embodiment of the present invention. The system multiplexing apparatus includes a time zone start time point calculating unit 11 calculating a start time point of a time zone having a possible completing (hereinafter also referred to as a complete zone), a time zone comparing unit 12 comparing a time point at which an audio PCK is to be multiplexed with the time zone start time point calculated by time zone start time point calculating unit 11, and a flag setting unit 13 setting an audio complete flag in accordance with the result of comparison by the time zone comparing unit 12. The functional configuration shown in FIG. 14 may be implemented by a CPU (Central Processing Unit) executing a prescribed program, or it may be implemented by hardware.

Figure 15:
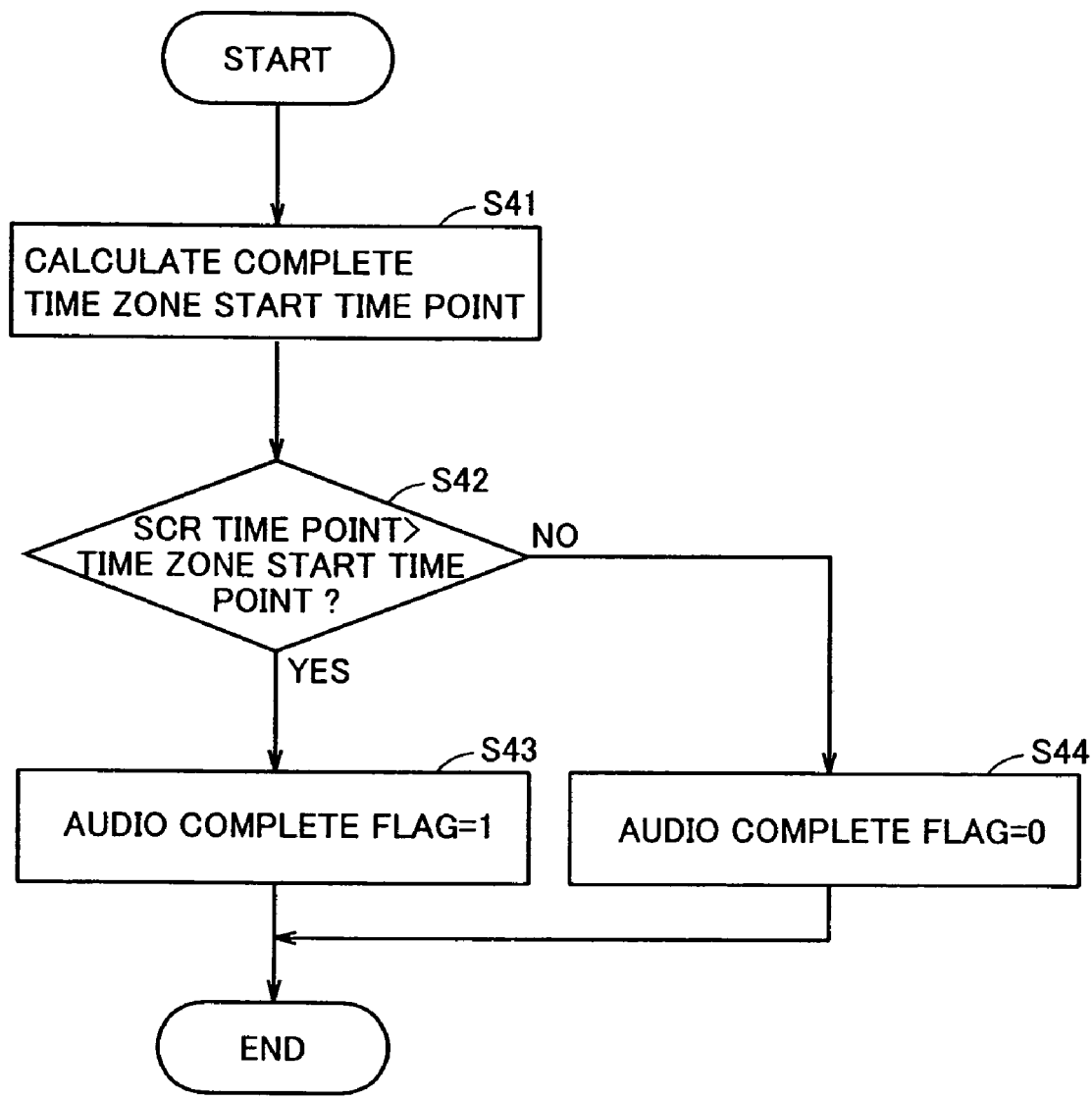
FIG. 15 is a flow chart representing process steps performed by the system multiplexing apparatus in accordance with the first embodiment of the present invention.

FIG. 15 is a flow chart representing the process steps performed by the system multiplexing apparatus in accordance with the first embodiment of the present invention. The system multiplexing apparatus of the present embodiment is conceived noticing that A_PCK is always output at least once in one period of A_PCK.

First, time zone start time point calculating unit 11 calculates the complete zone from the PCK period that is derived with reference to the audio bit rate (S41). Thereafter, time zone comparing unit 12 compares the time point at which the audio PCK is to be multiplexed (hereinafter referred to as the SCR time point) with the time zone start time point, and determines whether the time point at which the audio PCK is to be multiplexed is within the time zone (S42).

When the time point at which the audio PCK is to be multiplexed is within the time zone (S42, YES), flag setting unit 13 sets the audio complete flag to 1, and generates a complete PCK (S43). When the time point at which the audio PCK is to be multiplexed is not within the time zone (S42, NO), flag setting unit 13 sets the audio complete flag to 0, and generates an ordinary A_PCK (S44). It is noted that the start point of the complete zone is the GOP boundary time point.

The audio bit rate is determined, for example, by a user setting the image recording (sound recording) mode. Though it also depends on the product specification of the DVD recorder, the sound recording mode shown in FIG. 7 itself may be set, or the sound recording mode may be selected by switching between the high quality (short time)/standard/long time mode.

The complete zone start time point is calculated, backward from the GOP boundary time point, by using a time zone in which at least one A_PCK surely exists, that is, by using the audio PCK period. The SCR time point per 1 byte will be given by the following.

$$\text{SCR time point per 1 byte} = (8\text{bits/bit rate} \times 90 \text{ KHz}) \quad (1)$$

When the bit rate is 384 kbps, the SCR time point per 1 byte will be given by the following, in SCR time point equivalent.

$$\text{SCR time point per 1 byte} = 8\text{bits}/384 \text{ kbps} \times 90 \text{ KHz} = 720/384 \text{ SCR} = 1.875 \text{ SCR} \quad (2)$$

It is assumed that the ES amount in one PCK corresponds to the PCK length of 2048 bytes with PS header and PES header subtracted. When the ES amount is assumed to be 2020 bytes as shown in FIG. 3A, the period of one PCK will be $$\text{Period of 1 PCK} = 1.875 \text{ SCR/byte} \times 2020 \text{ bytes} = 3787.5 \text{ SCR} \quad (3)$$

Therefore, the complete zone is rounded up to 3788 SCR.

Figure 16:
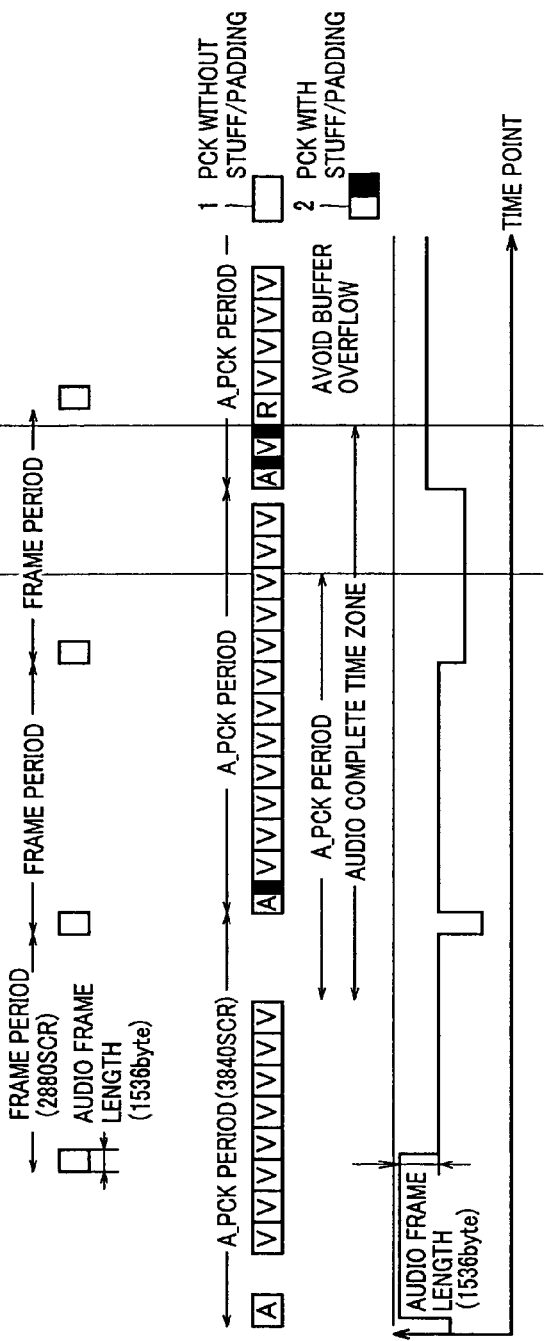
FIGS. 16A to 16D illustrate a complete zone applied in the system multiplexing apparatus in accordance with the first embodiment of the present invention.

FIGS. 16A to 16D illustrate the complete zone applied in the system multiplexing apparatus in accordance with the first embodiment. FIGS. 16A and 16B are similar to FIGS. 9A and 9B, and therefore, detailed description thereof is not repeated. As can be seen from FIG. 16C, the complete zone is from a time point preceding by one A_PCK period from the GOP boundary time point until the VOBU boundary time point. In the example of FIG. 16C, two complete A_PCKs are generated.

FIG. 16D represents transition of storage amount of the audio buffer. As shown in FIG. 16D, as the completing process takes place before the VOBU boundary, a complete A_PCK is not generated immediately after the VOBU boundary, and therefore, generation of a buffer overflow can be prevented.

Figure 17:
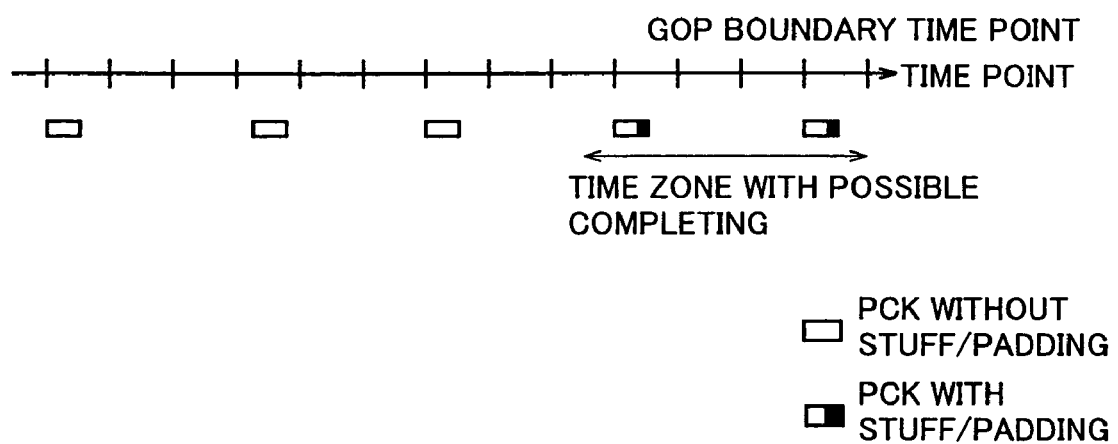
FIG. 17 is a schematic illustration of a complete zone applied in the system multiplexing apparatus in accordance with the first embodiment of the present invention.

FIG. 17 is a schematic illustration of the complete zone applied in the system multiplexing apparatus in accordance with the first embodiment of the present invention. It can be seen that two complete PCKs are generated in the complete zone.

As described above, in the system multiplexing apparatus in accordance with the first embodiment of the present invention, a complete zone using the GOP boundary time point as a start point is calculated, and when a time point at which an audio PCK is to be multiplexed is within the complete zone, the audio PCK is completed. Therefore, it becomes possible to improve efficiency of multiplexing by reducing multiplexing loss caused by insertion of a padding or stuff, while preventing generation of an overflow of the audio buffer.

SECOND EMBODIMENT

In the first embodiment of the present invention, complete zones are provided for all the bit rates, and dependent on whether the time point at which an audio PCK is to be multiplexed is within a complete zone or not, an A_PCK is completed. When the code length is so short as to cause no overflow of the audio buffer with the use of the virtual buffer control method only, the above described approach rather lowers the efficiency of multiplexing.

In the second embodiment, whether the time zone complete method in accordance with the first embodiment is to be applied or not is determined in accordance with audio frame length. The configuration of the encoder including the system multiplexing apparatus and the functional configuration of the system multiplexing apparatus in accordance with the present embodiment are the same as the configuration of the encoder shown in FIG. 1 and the functional configuration of the system multiplexing apparatus shown in FIG. 14 in accordance with the first embodiment. Therefore, overlapping description of the configurations and functions will not be repeated.

When the audio frame length is equal to or longer than a threshold value, the completing process is performed using the above described time zone complete method. When the audio frame length is shorter than the threshold value, the completing process is performed using the VOBU boundary forced complete method.

When the audio buffer has the capacity of 4 Kbytes and the remaining capacity of the buffer is to be controlled using 2 Kbytes as a central value as in a system multiplexing apparatus in compliance with the DVD specification, the threshold value of the audio frame length is set to 1024 bytes.

Figure 18:
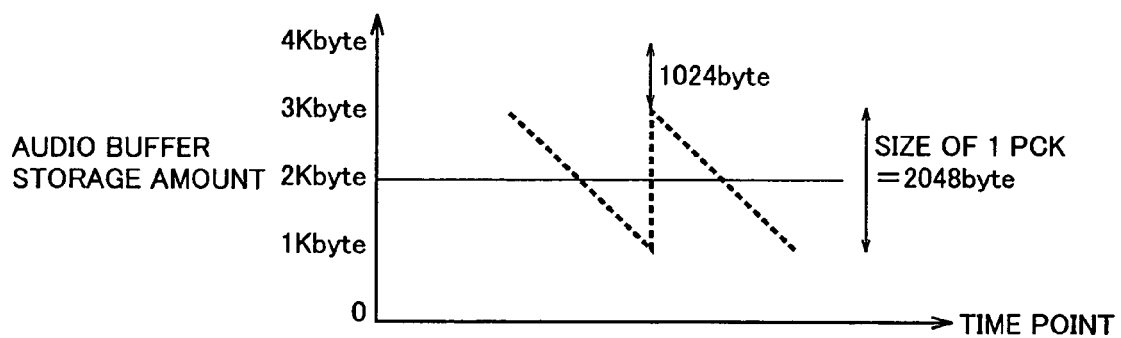
FIG. 18 illustrates a method of calculating a threshold value.

FIG. 18 is an illustration of the method of calculating the threshold value described above. At the center of the storage amount of the 4 Kbyte audio buffer, a PCK of 2 Kbytes is placed, and a difference between the upper end thereof and the upper limit of the buffer (1024 byte) is used as the threshold value. The reason for this is as follows. The storage amount of the audio buffer changes with 2 Kbytes being the center, and therefore, even when a VOBU boundary appears immediately after an output of A_PCK of 2 Kbytes and the completing process takes place, what results is simply a storage of data corresponding to the audio frame length in the audio buffer.

Figure 19:
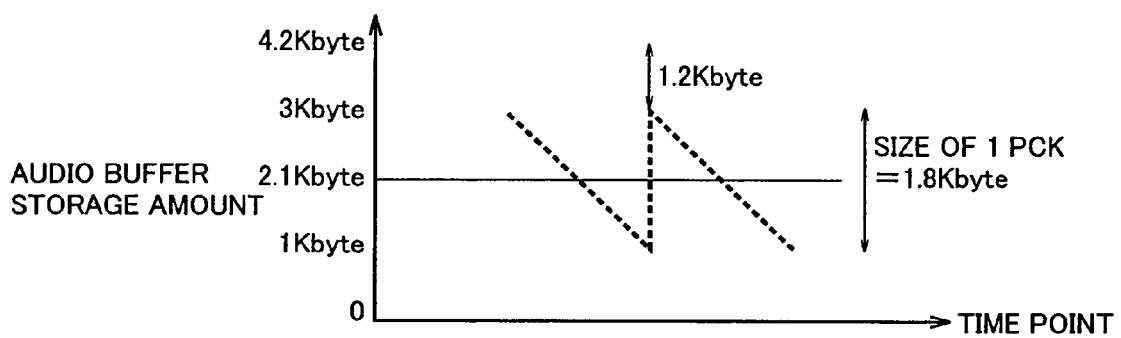
FIG. 19 illustrates a method of calculating a threshold value when the audio buffer has the capacity of 4.2 Kbytes and A_ES included in A_PCK is 1.8 Kbytes.

FIG. 19 is an illustration of the method of calculating the threshold value when the audio buffer has the capacity of 4.2 Kbytes and an A_ES included in an A_PCK is 1.8 Kbytes. At the center (2.1 Kbytes) of the storage amount of the 4.2 Kbytes audio buffer, a PCK of 1.8 Kbytes is placed, and a difference between the upper end thereof and the upper limit of the buffer (1.2 Kbytes) is used as the threshold value.

As described above, in the system multiplexing apparatus in accordance with the present embodiment, the time zone complete method and the VOBU boundary forced complete method are switched dependent on whether the audio frame length is not shorter than the threshold value or not. Therefore, lowering of the efficiency of multiplexing experienced when the audio frame length is short can be avoided.

THIRD EMBODIMENT

In the first embodiment, the process for calculating the complete zone in accordance with the bit rate is necessary, and in the second embodiment, a process for switching the methods by comparing the audio frame length with a threshold value is necessary. Therefore, in either method, process time becomes longer.

In the third embodiment of the present invention, the worst (longest) complete zone employed in a product is set in advance, so as to improve speed of processing. The configuration of the encoder including the system multiplexing apparatus and the functional configuration of the system multiplexing apparatus in accordance with the present embodiment are the same as the configuration of the encoder shown in FIG. 1 and the functional configuration of the system multiplexing apparatus shown in FIG. 14 in accordance with the first embodiment. Therefore, overlapping description of the configurations and functions will not be repeated.

By way of example, assume that the product bit rate of up to 192 Kbps is supported. In that case, the time zone start time point is 7575 SCR earlier than the GOP boundary. This value is set in advance in the system multiplexing apparatus, and the completing process is performed using this value regardless of the bit rate. Though AC-3 only is shown in FIG. 7, the present invention is also applicable to other Audio type such as MPEG-1 Audio.

As described above, in the system multiplexing apparatus in accordance with the present embodiment, the completing process is performed using a time zone start time point set in advance, and therefore, speed of processing of the system multiplexing apparatus can be improved.

FOURTH EMBODIMENT

In the first embodiment, when the time point is within the complete time zone, the completing process is performed even if the actual storage amount of the buffer is small and the completing process is unnecessary, causing multiplexing loss. In the present embodiment, whether the completing process is necessary or not is determined to reduce the multiplexing loss. The configuration of the encoder including the system multiplexing apparatus in accordance with the present embodiment is the same as the configuration of the encoder in accordance with the first embodiment shown in FIG. 1. The functional configuration of the system multiplexing apparatus of the present embodiment differs from the functional configuration of the system multiplexing apparatus shown in FIG. 14 only in that the flag setting unit additionally has a function of calculating the remaining capacity of the audio buffer. Therefore, overlapping description of the configurations and functions will not be repeated. In the present embodiment, the flag setting unit will be denoted by the reference character 13'.

Figure 20:
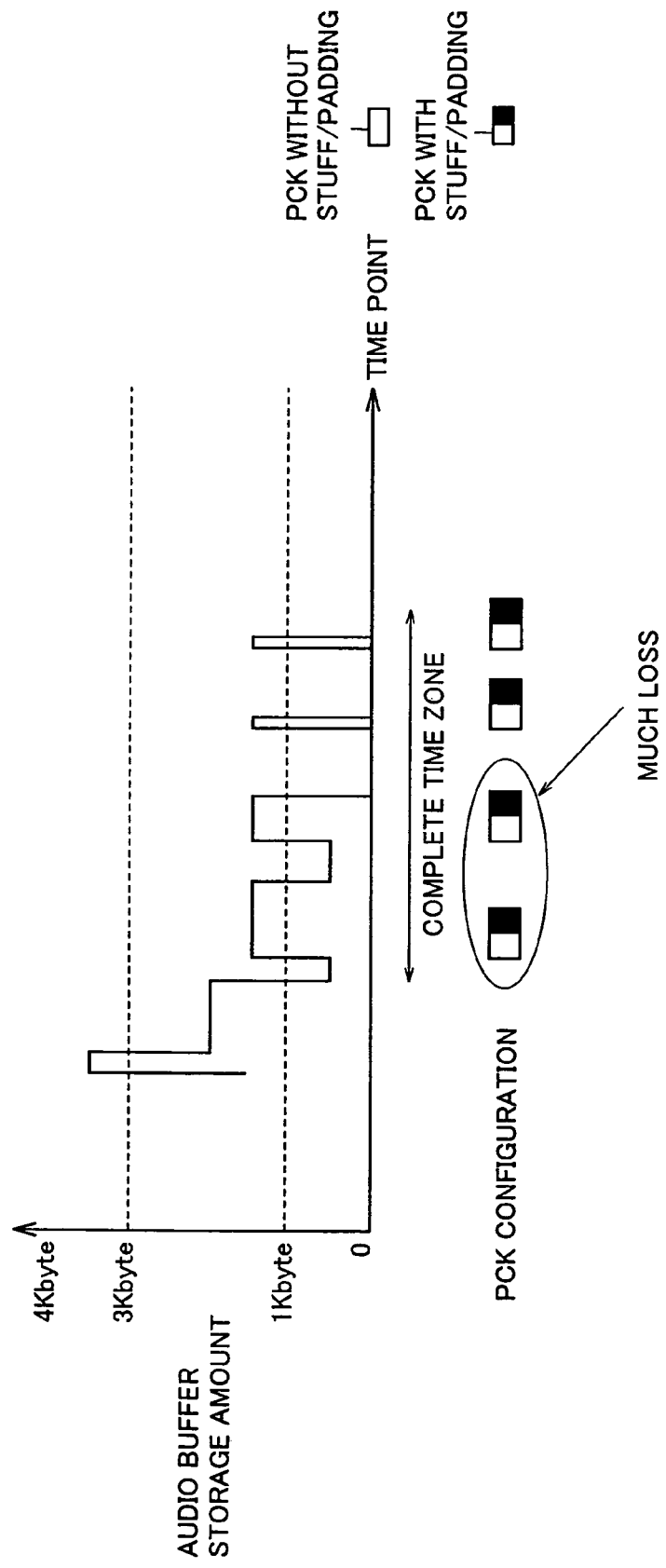
FIG. 20 illustrates audio buffer transition and an A_PCK configuration in the system multiplexing apparatus in accordance with the first embodiment of the present invention.

FIG. 20 illustrates transition of the audio buffer of the system multiplexing apparatus and the configuration of A_PCK in accordance with the first embodiment of the present invention. As can be seen from FIG. 20, four A_PCKS, of which time point to multiplex the audio PCK is within the complete time zone, will be completed.

Figure 21:
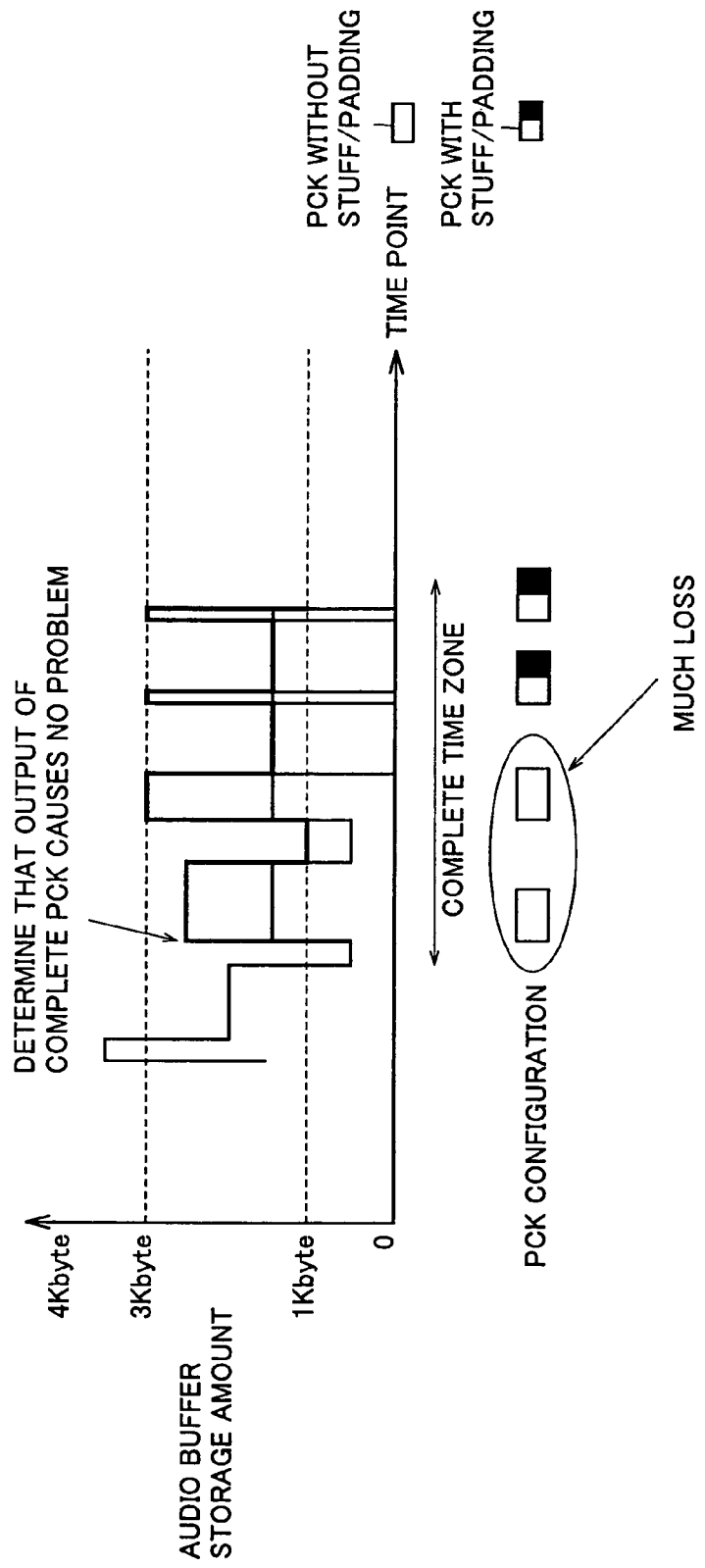
FIG. 21 illustrates audio buffer transition and an A_PCK configuration in the system multiplexing apparatus in accordance with the first embodiment of the present invention, with multiplexing loss reduced.

FIG. 21 illustrates transition of the audio buffer of the system multiplexing apparatus and the configuration of A_PCK in accordance with the first embodiment of the present invention, with the multiplexing loss reduced. As can be seen from FIG. 21, even when the first two A_PCKs within the time zone are not completed, no overflow occurs in the audio buffer.

In the system multiplexing apparatus in accordance with the fourth embodiment of the present invention, flag setting unit 13' calculates increase in the amount of storage of the buffer caused by the ESs in the PCKs output from the start of multiplexing and the amount of data drawn out from the audio buffer at the PTS (decode time point), and calculates the amount of storage of the audio buffer.

When it is determined by time zone comparing unit 12 that the SCR time point is within the time zone, flag setting unit 13' refers to the actual remaining capacity of the audio buffer, and determines whether a buffer overflow can be avoided even when an uncompleted, ordinary PCK is output and thereafter a complete PCK is continuously output. When it is determined that an overflow can be avoided, flag setting unit 13' sets the audio complete flag to 0, and outputs an ordinary A_PCK.

When it is determined that an overflow will occur, flag setting unit 13' sets the audio complete flag to 1, and outputs a complete A_PCK.

FIG. 22 represents audio buffer transition when the VOBU completing process is forced immediately after an output of an ordinary PCK. Here, whether the A_PCK is to be completed or not is determined by actually calculating the remaining capacity of the buffer, and therefore, an overflow does not occur in the audio buffer even when the VOBU completing process is forced immediately after the output of an ordinary PCK.

As described above, in the system multiplexing apparatus in accordance with the present embodiment, whether an A_PCK is to be completed or not is determined by calculating remaining capacity of the audio buffer. Therefore, generation of an unnecessary completed PCK can be avoided and the efficiency of multiplexing can be improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A system multiplexing apparatus outputting a video pack and an audio pack multiplexed with each other, comprising:
   a calculating unit calculating a time zone to be set in a video object unit, in accordance with audio bit rate;
   a comparing unit comparing a time point of multiplexing the audio pack with the time zone calculated by said calculating unit; and
   a setting unit setting whether the audio pack is to be completed or not in accordance with the result of comparison by said comparing unit; wherein
   said calculating unit defines the time zone from a time point earlier by an audio pack period than a group-of-picture boundary time point to said video object unit boundary time point.

2. A system multiplexing apparatus outputting a video pack and an audio pack multiplexed with each other, comprising:
   a calculating unit calculating a time zone to be set in a video object unit, in accordance with audio bit rate;
   a comparing unit comparing a time point of multiplexing the audio pack with the time zone calculated by said calculating unit; and
   a setting unit setting whether the audio pack is to be completed or not in accordance with the result of comparison by said comparing unit; wherein
   said setting unit sets, when audio frame length is not shorter than a prescribed value, whether the audio pack is to be completed or not in accordance with a result of comparison by said comparing unit and
   said setting unit sets, when said audio frame length is shorter than the prescribed value, forced completing of the audio frame immediately after said video object unit boundary time point.

* * * * *